United States Patent
Billau et al.

(10) Patent No.: US 10,551,918 B2
(45) Date of Patent: Feb. 4, 2020

(54) REMOTE CONTROL VIA PROXIMITY DATA

(71) Applicant: International Business Machines Corporation, Armonk, NY (US)

(72) Inventors: Michael R. Billau, Durham, NC (US); Alissa J. Hartenbaum, Maple Glen, PA (US); Trenton J. Johnson, Raleigh, NC (US); Saikrishna Vennam, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/288,543

(22) Filed: Feb. 28, 2019

(65) Prior Publication Data

US 2019/0196583 A1     Jun. 27, 2019

Related U.S. Application Data

(63) Continuation of application No. 16/180,566, filed on Nov. 5, 2018, which is a continuation of application
(Continued)

(51) Int. Cl.
*G09G 5/00* (2006.01)
*G06F 3/01* (2006.01)

(52) U.S. Cl.
CPC .............. *G06F 3/014* (2013.01); *G06F 3/017* (2013.01)

(58) Field of Classification Search
CPC ................................. G06F 3/014; G06F 3/017
See application file for complete search history.

(56) References Cited

U.S. PATENT DOCUMENTS

| 4,414,537 A | 11/1983 | Grimes |
| 5,670,987 A | 9/1997 | Doi et al. |

(Continued)

FOREIGN PATENT DOCUMENTS

WO    2009048662    4/2009

OTHER PUBLICATIONS

IBM, "Proximity Finger Gestures," IP.com No. IPCOM000189153D, Oct. 29, 2009, IBM, 3 pages.
(Continued)

*Primary Examiner* — Insa Sadio
(74) *Attorney, Agent, or Firm* — Lieberman & Brandsdorfer, LLC

(57) ABSTRACT

Embodiments relate to use of proximity sensors to control a digital interface. More specifically, proximity detection and analysis of the sensors, and translating the proximity into one or more commands is utilized to control the interface. In various embodiments, a system is provided with a set of sensors operatively coupled to a secondary surface. The sensors are in communication with a hub positioned proximal to the sensors. The hub is configured to be in communication with a remote interface. Similarly, the remote interface is configured operatively coupled to a remote physical device (e.g. digital interface). As changes in the sensor position data are measured, the remote interface device communicates an action based on a set of rules. The action is communicated from the interface to the remote physical device and functions to physically transform a functional aspect of the device.

18 Claims, 10 Drawing Sheets

Related U.S. Application Data

No. 15/244,672, filed on Aug. 23, 2016, now Pat. No. 10,168,776.

(56) References Cited

U.S. PATENT DOCUMENTS

| | | | |
|---|---|---|---|
| 7,498,956 | B2 | 3/2009 | Baier et al. |
| 8,743,052 | B1 | 6/2014 | Keller et al. |
| 9,218,058 | B2 | 12/2015 | Bress et al. |
| 9,552,069 | B2 | 1/2017 | Gilad-Bachrach et al. |
| 9,846,482 | B2 | 12/2017 | Seth |
| 2003/0214481 | A1 | 11/2003 | Xiong |
| 2004/0068409 | A1 | 4/2004 | Tanaka et al. |
| 2007/0214886 | A1* | 9/2007 | Sheynblat ............... G01C 21/16 73/509 |
| 2008/0136775 | A1 | 6/2008 | Conant |
| 2010/0023314 | A1 | 1/2010 | Hernandez-Rebollar |
| 2013/0147722 | A1 | 6/2013 | Lin et al. |
| 2015/0035743 | A1 | 2/2015 | Rosener |
| 2015/0185850 | A1 | 7/2015 | Guilak et al. |
| 2016/0162022 | A1 | 6/2016 | Seth |
| 2016/0246369 | A1 | 8/2016 | Osman |

OTHER PUBLICATIONS

Chen, Ke-Yu, et al., "uTrack: 3D Input Using Two Magnetic Sensors," Proceedings of the 26th Annual ACM Symposium on User Interface Software and Technology, pp. 237-244, ACM, 2013.

Mikhaylov, Konstantin, et al., "Wireless Sensor Glove Interface and its Application in Digital Holography," 2013 IEEE 4th International Conference on Cognitive Infocommunications (CogInfoCom), pp. 325-330, IEEE, 2013.

Beciri, D., "MIT Glove Mouse Adds Second Pointer to Your Digital Experience," Apr. 2010, http://www.robaid.com/gadgets/mit-glove-mouse-adds-second-pointer-to-your-digital-experience.htm.

Rowberg, J., New Keyglove Firmware, KGAPI Protocol, and Working Bluetooth, Aug. 2014, https://www.kickstarter.com/projects/jrowberg/keyglove-wearable-input-device/posts/938410.

Bajer, B., et al. "Huffman base-4 text entry glove (H4-TEG)" Proceedings of the International Symposium on Wearable Computing—ISWC 2012, 41-47. New York: IEEE.

List of IBM Patents or Applications Treated as Related, Feb. 2019. Feb. 28, 2019.

Nov. 5, 2018, U.S. Appl. No. 16/180,566.

Aug. 23, 2016, U.S. Appl. No. 15/244,672, 2018/0059784.

Aug. 23, 2016, U.S. Appl. No. 15/244,730, 2018/0059785.

Aug. 23, 2016, U.S. Appl. No. 15/244,765, 2018/0059786.

Aug. 23, 2016, U.S. Appl. No. 15/244,800, 2018/0058846.

\* cited by examiner

REMOTE CONTROL VIA PROXIMITY DATA

CROSS REFERENCE TO RELATED APPLICATION(S)

This application is a continuation patent application claiming the benefit of the filing date of U.S. patent application Ser. No. 16/180,566 filed on Nov. 5, 2018 and titled "Remote Control Via Proximity Data", which is a continuation of U.S. patent application Ser. No. 15/244,672 filed on Aug. 23, 2016 and titled "Remote Control Via Proximity Data", now U.S. Pat. No. 10,168,776, the entire contents of which are hereby incorporated by reference.

BACKGROUND

The present embodiments relate to sensors to control a digital interface. More specifically, the embodiments relate to proximity detection and analysis of the sensors, and translating the proximity into one or more commands to control the interface.

The term digital interface, also known as digital visual interface, is a video display interface device to connect a video source to a display device. A controller is an input device that connects to the digital interface. It is known in the art that the controller may employ one or more buttons with activation of the button(s) to communicate a command from the controller to the interface. At the same time, the interface may include a visual display with a capacitive sensor configured to respond to capacitive touch, also known as a touch screen. Accordingly, whether through a controller or a capacitive sensor visual display, direct communication with the digital interface is supported.

A remote control is an electronic device employed to control another device. Remote control apparatus are known in the art to operate via an infra-red or radio-frequency signal. With respect to a digital interface, the remote control may employ one or more buttons mapped to the interface and function to interact with the interface. Recent developments associated with the remote control include one or more motion or position sensors. A position sensor conveys a precise location to the interface. The motion sensor detects movement and conveys the movement to the interface. The motion sensor detects physical movement on a device or within an environment, and an associated system or software processes the motion into an action or information. Accordingly, sensors and buttons may be used to remotely communicate with a digital interface.

SUMMARY

The embodiments include a system, computer program product, and method for operating a set of proximity sensors in a learn mode, which effectively converts associated measurements into a physical transformation.

In one aspect, the system is provided with a set of sensors operatively coupled to a sensor hub. The sets of sensors includes first and second sensors, with the first sensor fixed to a first location and the second sensor fixed to a second location, and the hub fixed to a third location. Each of the first, second, and third locations are separate locations. The hub is configured in communication with a remote interface. Similarly, the remote interface is configured operatively coupled to a device. A tool is provided in communication with the hub, with the tool configured to utilize positioning of the sensors and to respond to changes in the position of the sensors. The tool measures an initial set of sensor positions and a secondary characteristic associated with at least one of the sensors, assigns the secondary characteristic to a secondary measurement and saves it as sensor metadata. The tool associates a secondary rule with the sensor metadata, with the secondary rule defining a translation between the secondary characteristic and the sensor position data. The tool reads a changed position of the sensors, and searches a corpus with the secondary rule and changed position data for evidence of at least one action matching the changed position. The action is selected by the tool and communicated from the tool to a remote physical device and functions to physically transform a functional aspect of the device.

In another aspect, a computer program product is provided to utilize proximity sensor positioning to interface with a device. The computer program product includes a computer readable storage device with embodied program code that is configured to be executed by a processing unit. Program code is provided to measure an initial set of sensor positions and a secondary characteristic associated with at least one sensor. The program code is provided to assign the secondary characteristic to a secondary measurement and save it as sensor metadata. The program code is provided to associate a secondary rule with the sensor metadata, with the secondary rule defining a translation between the secondary characteristic and the sensor position data. The program code is provided to read a change position of the sensors and search a corpus with the changed position and secondary rule for evidence of at least one action matching the changed position. More specifically, program code is provided to select the action and communicate it to a remote physical device, with the action causing a physical transformation of a functional aspect of the physical device.

In yet another aspect, a method is provided for utilizing proximity sensor positioning for interfacing with a physical device. An initial set of sensor positions and a secondary characteristic associated with at least one sensor are measured. A secondary characteristic is assigned to a secondary measurement and saved as metadata. A secondary rule is associated with the sensor metadata. The secondary rule defines a translation between the secondary characteristic and the sensor position data. A changed position of the sensors is read and a corpus searched with the changed position and secondary rule for evidence of at least one action matching the changed position. The action is selected and communicated it to a remote physical device and the action causes a physical transformation of a functional aspect of the physical device.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments unless otherwise explicitly indicated.

DETAILED DESCRIPTION

Figure 1:
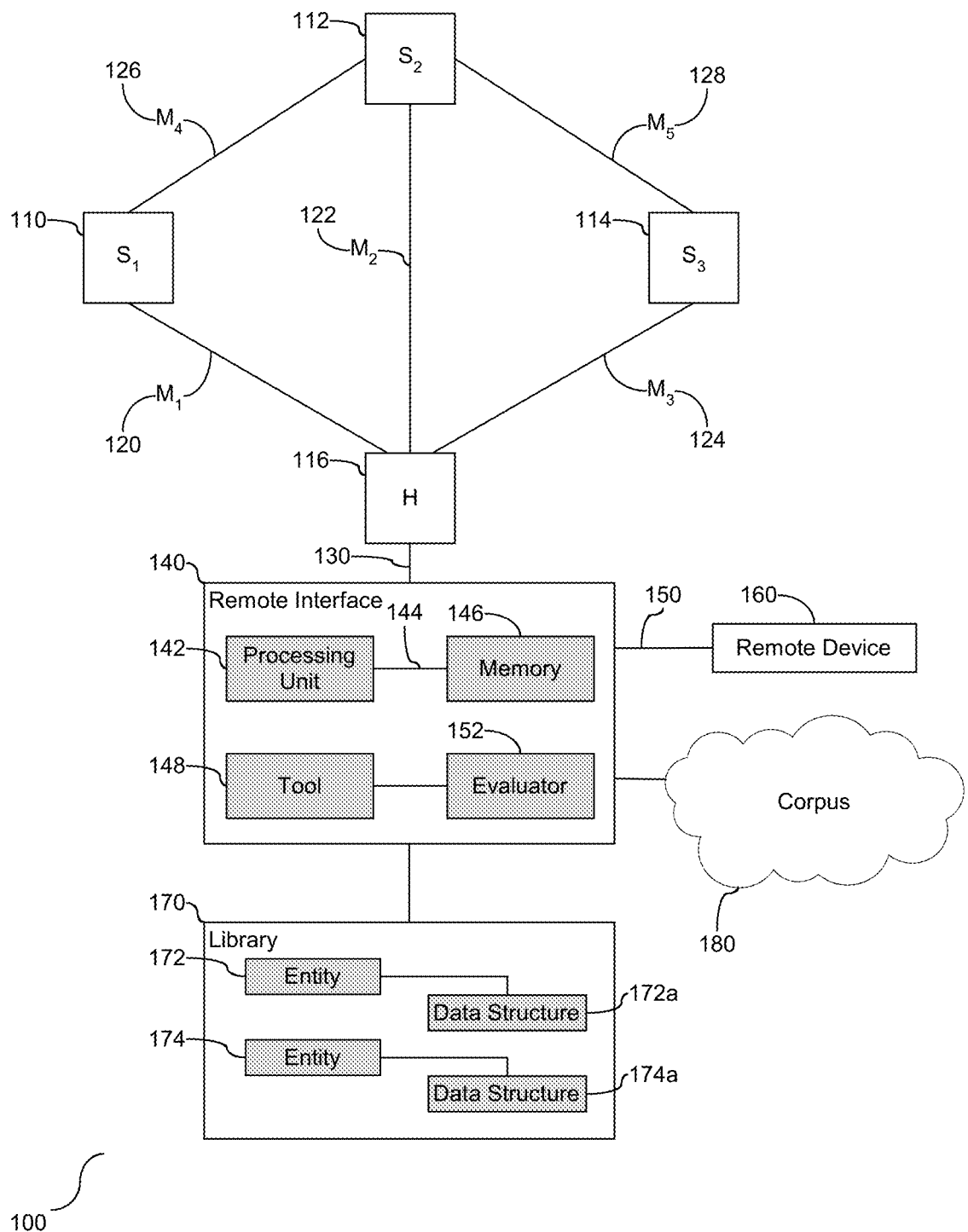
FIG. 1 depicts a block diagram illustrating a system and associated components configured with two or more proximity sensors and use of these sensors to control a remote digital interface.

It will be readily understood that the components of the present embodiments, as generally described and illustrated in the Figures herein, may be arranged and designed in a wide variety of different configurations. Thus, the following detailed description of the embodiments of the apparatus, system, and method of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

A proximity sensor is known in the art as a sensor that detects the presence of a nearby object but does not require physical contact to emit or otherwise activate a signal. The advantage of the proximity sensor is that it mitigates or otherwise eliminates direct physical contact between the sensor and an interface, such as a visual display with a capacitive sensor. A system employing one or more proximity sensors is configured to detect closeness, and as described below, closeness between adjacently positioned sensors and an associated detector.

As described below in detail, there are different modes of operation of sensors, and specifically proximity sensors, and use thereof. Each of the modes will be described in detail below. The modes include: listening, writing, training, and learning. The listening mode takes place after the sensors have been positioned and the rules have been established. It relates to the manner in which the proximity of the sensors is translated into a transformation of a physical device. The writing mode takes place after the sensors have been positioned, and it relates to the process in which rules are established. More specifically, it relates to the manner in which a set of sensor positions are translated into a rule to establish the device transformation. The training mode takes place after the sensors have been positioned and the rules have been established. It relates to the manner in which proximity of the sensors is associated with an action. The learning mode relates to calibrating the sensors to accommodate the physical conditions of the environment and to account for these physical conditions in the sensor positioning and rule translation.

A proximity sensor is a sensor employed to detect presence of nearby objects without any physical contact. As described herein, the function of the proximity sensor is extended to address remote control of a digital interface. The use of the proximity sensor(s) eliminates the need for direct physical interaction as well as tracking motion. Referring to FIG. 1, a block diagram (100) is provided illustrating a system and associated components configured with two or more proximity sensors and use of these sensors to control a remote digital interface. As shown, a plurality of sensors $S_1$ (110), $S_2$ (112), and $S_3$ (114) are shown in communication with a sensor hub, H, (116). It is understood that the hub (116) may function as an additional sensor in the system. Although three sensors are shown and described, the quantity of sensors should not be considered limiting. Each sensor (110)-(114) is referred to herein as a proximity sensor.

Measurements are acquired between each sensor and the hub, and between adjacently positioned sensors. Based on the sensor example shown herein, five measurements are acquired. A first measurement, $M_1$, (120), is a first distance between the first sensor, $S_1$ (110), and the hub, H (116), a second measurement, $M_2$, (122), is a second distance between the second sensor, $S_2$ (112), and the hub, H (116), and a third measurement, $M_3$, (124), is a third measurement between a third sensor, $S_3$ (114), and the hub, H (116). In addition to the measurement between each sensor and the hub, measurements between adjacently positioned sensors are acquired, including a fourth measurement, $M_4$, (126), representing a fourth distance measurement between the first and second sensors, $S_1$ (110) and $S_2$ (112), and a fifth measurement, $M_5$, (128), representing a fifth distance measurement between the second sensor and the third sensor, $S_2$ (112) and $S_3$ (114).

As shown, distances are measured with respect to one or more of the adjacently positioned sensors and between each sensor (110)-(114) and the hub (116). Each of the distance measurement(s) are communicated to the sensor hub (116). The measurements are each directed to proximity, and more specifically, the nearness of the distance between the sensors for a set period of time. The sensors (110)-(114) are not required to be touching. Rather, the measurements take effect when the sensors are determined to be held in a position for a set period of time. It is the time period or time interval that causes the proximal distance between the sensors and between the sensors and the hub to be measured.

There are different categories of proximity sensors that may be utilized herein, including but not limited to, magnetic, capacitive, and acoustic. Regardless of the form of the proximity sensor(s), a first wireless connection (130) is provided between the sensor hub (116) and a remote interface (140), and a second wireless connection (150) is provided between the remote interface (140) and a remote device (160). In one embodiment, the remote device (160) is a digital interface. The remote interface (140) is configured with a processing unit (142) operatively coupled to memory (146) across a bus (144). As shown, a tool (148) is embedded in the remote interface (140). The tool (148) functions to process received sensor data, and specifically sensor position data. As shown, a library (170) is operatively coupled to the remote interface (140). The library (170) includes sensor position data for a plurality of entities (172), (174). In one embodiment, a data structure is stored in the library, with a separate data structure (172a), (174a), for each defined entity (172) and (174), respectively. Details of the data structure are shown and described in FIG. 2. Each defined entity has a data structure with sensor proximity data and associated action signal data for the remote device (160). Accordingly, the system is calibrated with corresponding sensor proximity data for actions associated with the remote device (160).

As sensor proximity data is received from the hub (116), the tool (148) consults the library (170). The consultation may be limited to a select data structure in the library, or in one embodiment may be expanded to include additional data structures or the library in its entirety. In one embodiment, the tool (148) consults a corpus (180) for evidence of a detected action associated with the proximity data and, which is also referred to herein as a time period. A corpus is understood to be a large or complete collection of materials. The sensor position data received from the hub (116) may return an exact match, or in one embodiment, a non-exact match. An evaluator (152) is provided in communication with the tool (148). In the event that an exact match is not returned from the library (170) or the corpus (180), the tool (148) forwards an outcome set of sensor position entries to the evaluator (152) for further evaluation. More specifically, the evaluator (152) gathers two or more possible outcomes from the corpus (180). The possible outcomes may be based on the measured time interval together with sensor distance measurements. For example, in one embodiment, there may be three measurements, and the search did not produce an outcome that matches all three measurements. Instead, the search found two outcomes with two measurements that match. These two outcomes would become members of a possible outcome set. Similarly, in one embodiment, the possible outcome set may be based on a match of each measurement but with a different time interval. Similarly, in one embodiment, the outcome set may be a combination of possible outcomes based on the same time interval with different proximity measurements, or based on different time intervals with the same proximity measurements. Accordingly, the corpus search includes an array of measurements associated with the sensors and associated time intervals.

Based on the applied scores, the evaluator (152) selects an entry from the outcome set, together with the corresponding action signal, and forwards the signal to the remote device (160) across the connection (150). The action signal physically transforms the remote device (160) in a manner that corresponds with an action as dictated by the action signal. In one embodiment, the action physically transforms the remote device from a first state to a second state. Similarly, in one embodiment, the action physically transforms a functional aspect of the remote device from a first functional state to a second functional state. Accordingly, sensor proximity data is employed to communicate an action signal to a remote device, with the action signal causing a physical transformation of the remote device or a physical transformation of a state of the device.

Figure 2:
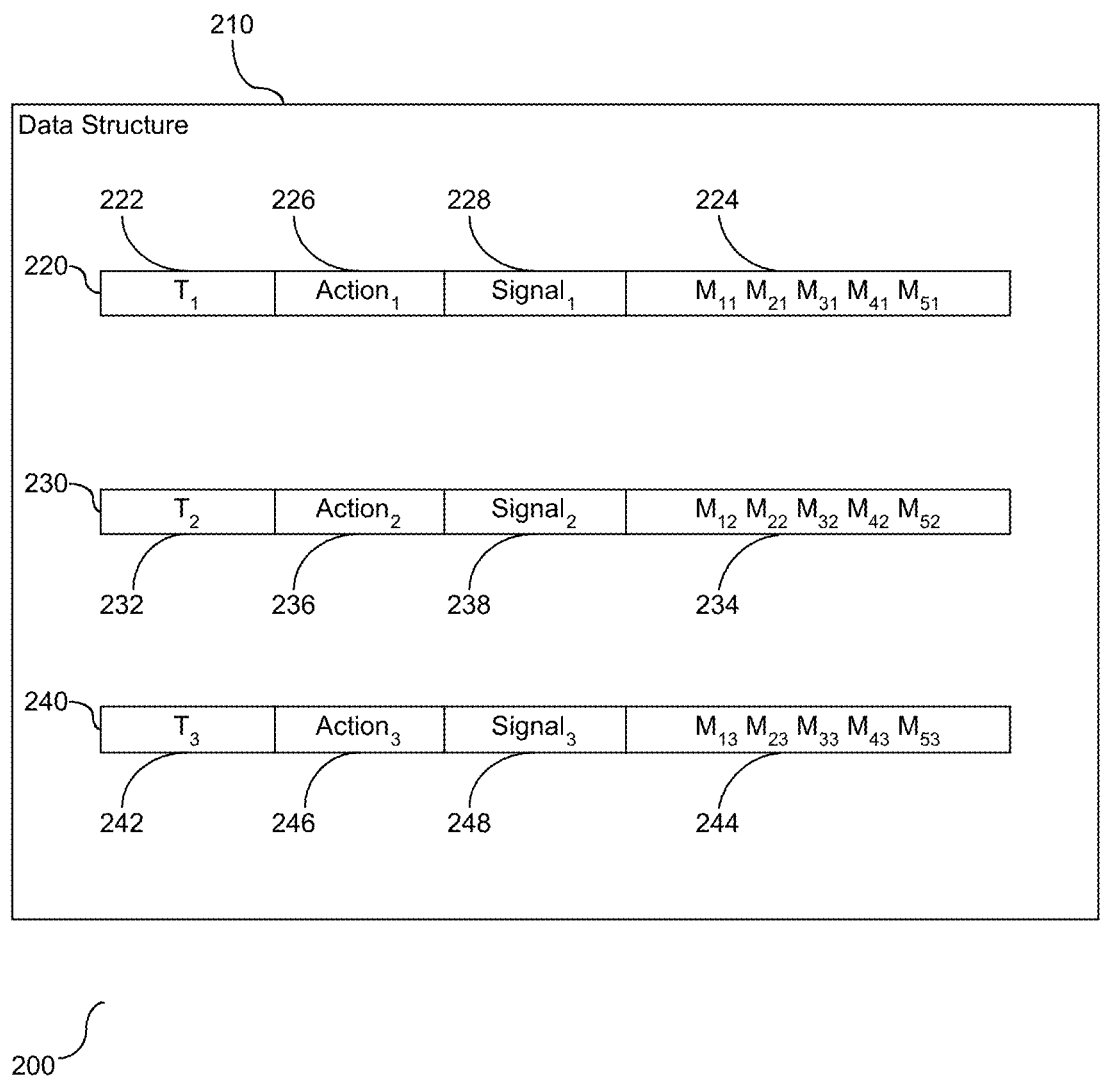
FIG. 2 depicts a block diagram illustrating a data structure for proximity sensor data.
Figure 3:
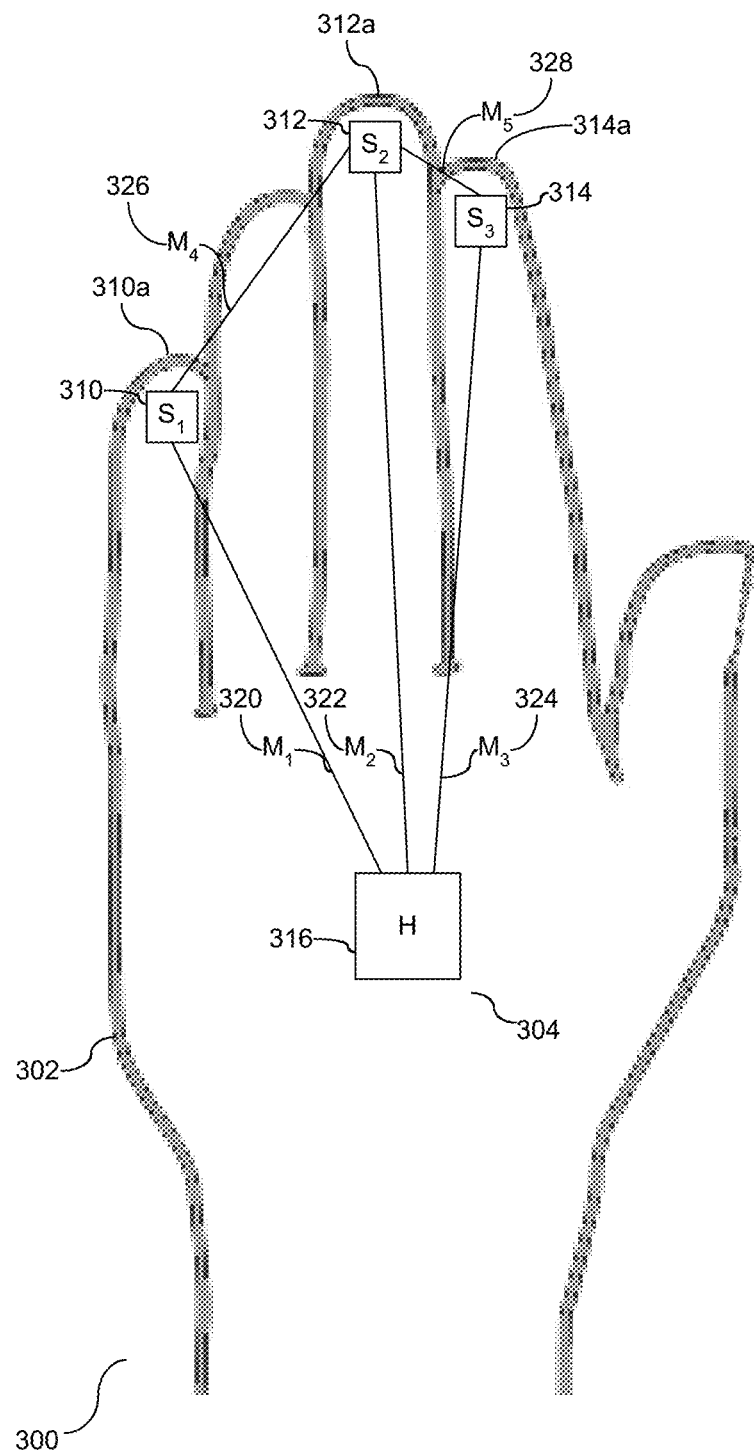
FIG. 3 depicts a block diagram illustrating a sensor-hub configuration.

Referring to FIG. 2, a block diagram (200) is provided illustrating a data structure for proximity sensor data. As shown, the data structure (210) is associated with a particular entity, e.g. user. The example data structure includes proximity data for three sensors, although in one embodiment, a different quantity of sensors may be employed. Each sensor is positioned and associated measurements are ascertained between each individual sensor as related to the hub. FIG. 3 described below illustrates the positioning of sensors relative to the hub. As shown, there are multiple signal entries and associated actions, with each entry corresponding to a set of measurements. For descriptive purposes, a first measurement, $M_1$, is a first distance between the first sensor, $S_1$, and the hub, H, a second measurement, $M_2$, is a second distance between the second sensor, $S_2$, and the hub, H, and a third measurement, $M_3$, is a third measurement between a third sensor, $S_3$, and the hub, H. In addition to the measurement between each sensor and the hub, each entry in the data structure includes measurements between adjacently positioned sensors, including a fourth measurement, $M_4$, representing a fourth distance measurement between the first and second sensors, $S_1$ and $S_2$, and a fifth measurement, $M_5$, representing a fifth distance measurement between the second sensor and the third sensor, $S_2$ and $S_3$.

Three entries are shown in the data structure (210). A first entry (220) defines a first time measurement, $T_1$, (222), an action (226), action$_1$, and associated signal (228), signal$_1$, for a first set of measurements $\{M_{11}, M_{21}, M_{31}, M_{41}, M_{51}\}$ (224). Similarly, a second entry (230) defines a second time measurement, $T_2$, (232), an action (236), action$_2$ and associated signal (238), signal$_2$, for a second set of measurements $\{M_{12}, M_{22}, M_{32}, M_{42}, M_{52}\}$ (234), and a third entry (240) defines a third time measurement, $T_3$, (242), an action (246), action$_3$ and associated signal (248), signal$_3$, for a third set of measurements $\{M_D, M_{23}, M_{33}, M_{43}, M_{53}\}$ (244). Although each entry in the data structure includes an associated time measurement, $T_1$, $T_2$, and $T_3$, one or more of the time measurements may be the same length of time, a different length of time, or a combination with some, but not all, of the time measurements being the same. Accordingly, the data structure (210) organizes the sensor proximity data and time measurement, with respect to a corresponding action.

There are many configurations available for the sensors and hub. Referring to FIG. 3, a block diagram (300) is provided illustrating a sensor-hub configuration. As shown in this example, there are three sensors, $S_1$ (310), $S_2$ (312), and $S_3$ (314), each in communication with a hub, H, (316). In one embodiment, the communication between each sensor (310), (312), and (314) and the hub (316) is wireless, with the format of the wireless communication depending on the format of the respective sensors and hub. Similarly, in one embodiment, the sensors and hub are configured to be placed in a hand (302), with the each sensor positioned on a finger and the hub positioned on the palm (304). In the example shown herein, the first sensor S (310) is positioned on the fifth finger (310a), the second sensor $S_2$ (312) is positioned on the third finger (312a), and the third sensor $S_3$ (314) is positioned on the second finger (314a). With three sensors, there are five measurements, with the combination of measurements corresponding to an action as defined by an action signal. In the example shown herein, the first measurement, $M_1$ (320), is from the first sensor, S (310), to the hub, H, (316), the second measurement, $M_2$ (322), is from the second sensor, $S_2$ (312), to the hub, H, (316), the third measurement, $M_3$ (324) is from the third sensor, $S_3$ (314), to the hub, H, (316), the fourth measurement, $M_4$ (326), is from the first sensor, $S_1$ (310), to the second sensor, $S_2$ (312), and the fifth measurement, $M_5$ (328), is from the second sensor, $S_2$ (312), to the third sensor, $S_3$ (314). Accordingly, measurements are acquired between sensors, and between each sensor and the hub.

In one embodiment, a listen mode takes place after the sensors have been positioned and sensor distance rules have been established. The mode relates to the manner in which the proximity of the sensors is translated into a transformation of a physical device. Position measurements are acquired when the sensors are actually held in a position for a defined time interval, following by the position measurements being associated with an action based on the initial set of distance rules that were established. This action is communicated to a remote physical device and physically transforms a functional aspect of the device. In one embodiment, a library contains an array of available distance rules associated with the system. Details of the listen mode are shown and described below in FIG. 4.

Figure 4:
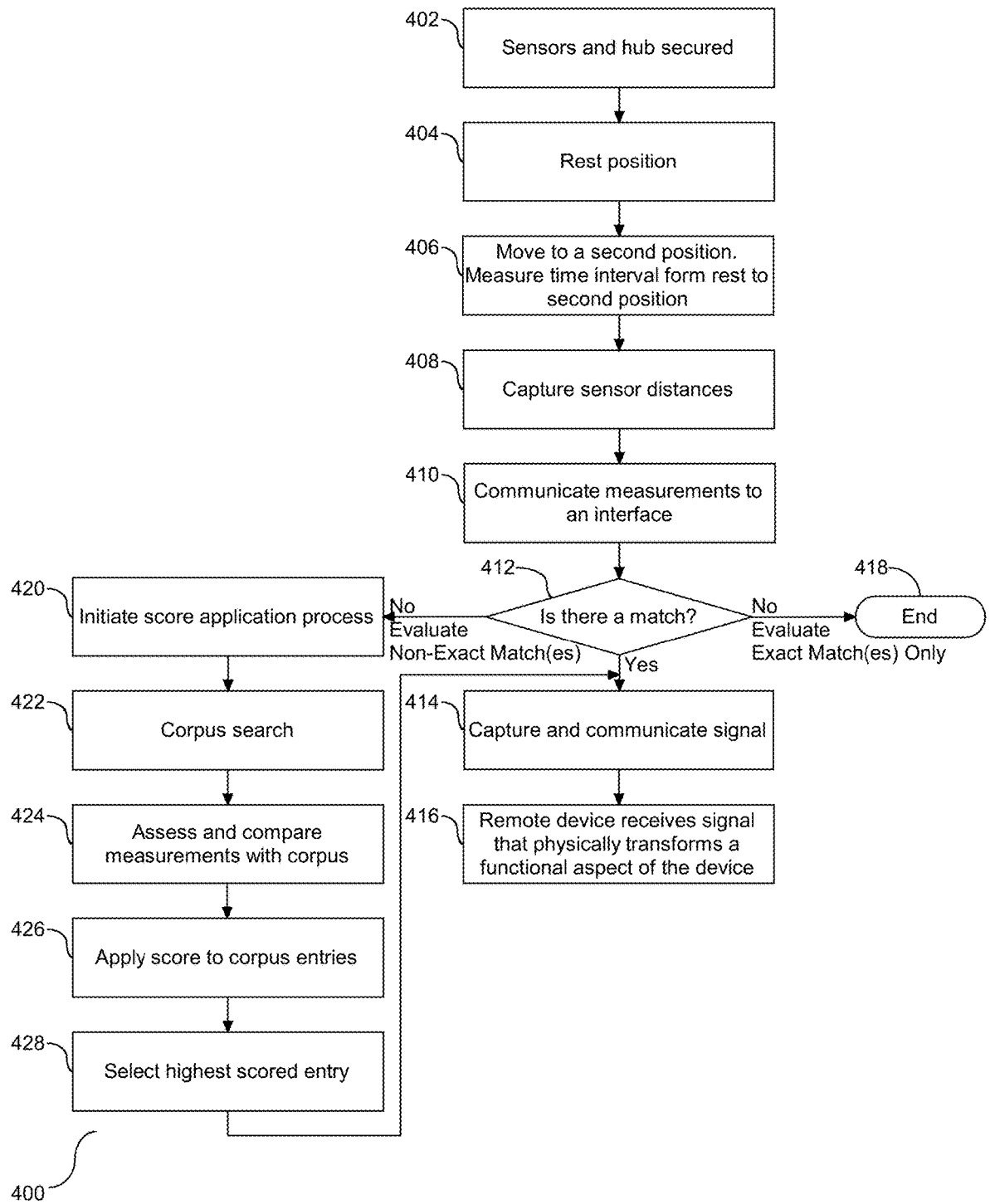
FIG. 4 depicts a flow chart illustrating an example use case of the sensor proximity and converting associated measurements into a physical transformation.

Each action and corresponding signal is based on a set of measurements, and specifically proximity of the defined distances, for a time interval. Referring to FIG. 4, a flow chart (400) is provided illustrating an example use case of the sensor proximity and converting associated measurements into a physical transformation, also referred to herein as a listen mode. As shown, a set of sensors and an associated hub are secured to one or more secondary surfaces or objects (402). In one embodiment, the secondary surface is a hand and each sensor is secured to a separate finger, and the hub is secured to the palm of the same hand that is in receipt of the sensors. The sensors are placed in a rest position for a time interval (404). Thereafter, movement takes place and one or more of the sensors change position, and more specifically, one or more of the sensors are moved from the rest position to a second position (406). In one embodiment, the second position is a pre-configured state. At the same time, a time interval from the rest position to the second position is measured (406). When the time interval has reached a defined minimum time period, the sensor distances are captured (408). It is understood that to reach an alignment, the sensors need to change positions, such as from a rest position to a first position or from a first position to a second position. Accordingly, the time interval is used to differentiate unintended sensor movement and intended sensor positioning.

As shown in FIG. 3, for a system with three sensors, there are five measurements. Similarly, in a system with two sensors there are three measurements, and a system of four sensors there are seven measurements. The set of captured measurements are communicated to an interface (410), which in one embodiment may be a remote interface. For example, in one embodiment, each user is associated with a data structure as shown and described in FIG. 2. Following step (410), the data structure associated with the subject of the use case is consulted to assess if there is a match between the current proximal sensor measurements and entries in the data structure (412). It is understood that the match may be an exact match or a non-exact match, and both parameters are demonstrated herein. A positive response to the assessment is followed by capturing a signal associated with the match and communicating the signal for the matching entry to a remote device (414). More specifically, receipt of the signal by the remote device physically transforms a functional aspect of the remote device (416). In one embodiment, the remote device is a digital interface, such as a smart television, a game system, a slide show, etc., and the action associated with the signal transforms the remote device from a first state to a second state. For example, in one embodiment, the first state may be an off state and the second state may be an on state, and the signal may transform the device from off to on or on to off, depending on the original state of the device. Accordingly, one of the measurement evaluations at step (412) searches for a match between the measurements and the configurations defined in the associated library.

It is understood that proximity measurement is not necessarily precise. In fact, it is understood that the measurements between each sensor and the hub, together with measurements between adjacently positioned sensors may not exactly match the entries in the data structure. Similarly, the time measurement(s) may also not match the entries in the data structure. This is demonstrated in FIG. 4 with a negative response to the determination at step (412). The system may be set to respond to exact matches, or further evaluate non-exact matches. If the system is set to capture the measurements and respond only to exact matches, then a negative response at step (412) concludes the evaluation and associated signal communication (418). However, if the system is set to evaluate non-exact matches, then the process initiates a score application process (420). More specifically, a corpus is searched for evidence of the intended action, if any, for the detected proximal measurements (422). The sensor measurements are assessed and compared with measurements of each of the corpus entries (424), and a score is applied to each corpus entry based on the comparison (426). The corpus entry with the highest score is selected (428), and the process returns to step (414) to capture and communicate the corresponding signal of the matching entry to the remote device. Accordingly, the listening mode may be configured to accommodate exact and non-exact sensor measurements to determine intended sensor positioning.

For the process shown and described in FIG. 4, a time interval is employed for holding the sensors in a set position, and capturing the position of the sensors through the time interval. In one embodiment, a visual indicator is provided to communicate completion of the time interval. For example, in one embodiment, a light may illuminate or change colors based on meeting the time interval threshold. Similarly, in one embodiment, the indicator may be auditory, with a sound emitted based on meeting the time interval. In either embodiment, at the completion of the time interval, the sensors measurements are acquired for position evaluation. Accordingly, an indicator may be employed to facilitate differentiating between intended and unintended motion of the sensors.

Figure 5:
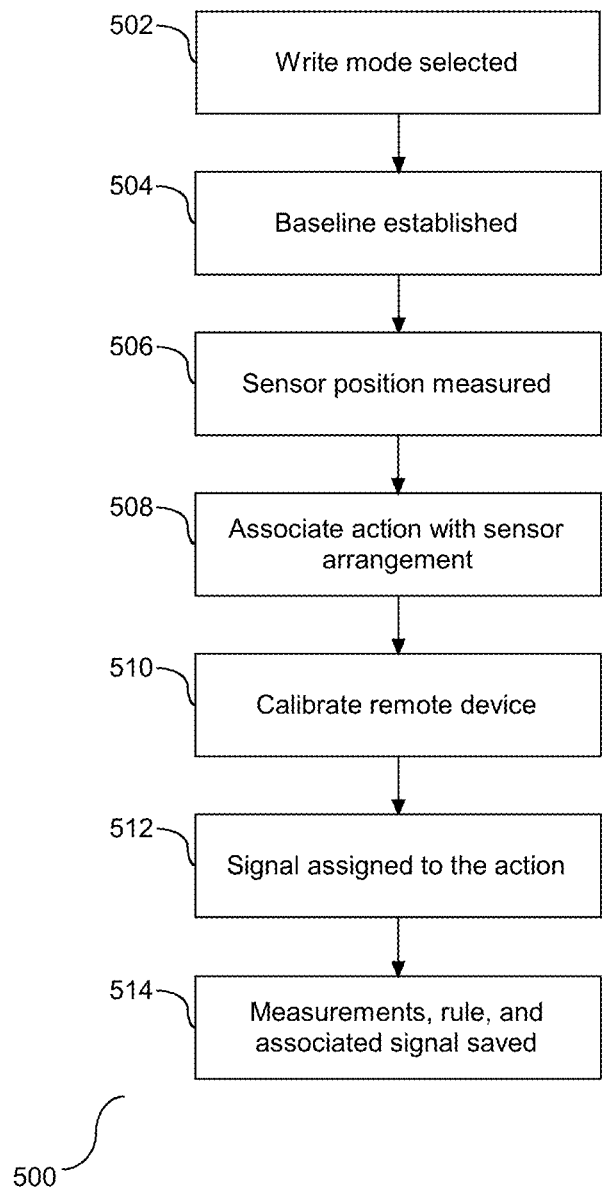
FIG. 5 depicts a flow chart illustrating a process for assigning an action and associated signal to a set of measurements.

As shown in FIG. 2, a data structure is maintained in a library or corpus defining a set of measurements with an associated action. The data structure may be populated with additional measurements and associated actions, also referred to as a write mode. Referring to FIG. 5, a flow chart (500) is provided illustrating a process for assigning an action and associated signal to a set of measurements, also referred to herein as a write mode. As shown, the write mode for the sensors and associated system is selected or otherwise entered (502). In one embodiment, the write mode is where rules are assigned to measurements or measurements are assigned to rules. Prior to acquiring position measurements, a baseline of the system is established (504), wherein the sensors are placed in a set position so that each sensor is held proximal to the other sensors in the arrangement for a set interval. Once the baseline is established, position changes through the sensor position(s) may take place. As one or more of the sensors change position and are actually held in the changed position for a defined time interval, the changed sensor position(s), also referred to herein as the new sensor position(s), is measured (506). For example, the changed sensor position may be a new position changed from a baseline position, e.g. prior to entering the write mode. An action is selected to associate with the sensor arrangement, e.g. with the new sensor position(s) (508). In one embodiment, a library contains an array of available actions supported by the remote device. At step (506) the sensor position is acquired, and based on this position an action from the library, or in one embodiment an alternative data structure, may be selected and assigned to the sensor position (508). In one embodiment, the selection at step (508) is based on actions that are available, e.g. unassigned, or in one embodiment, may include an action that is assigned to a different sensor configuration. Similarly, in one embodiment, a previously configured action is selected so that a new set of measurements may be applied to an associated rule and signal. Accordingly, as sensor positions are acquired, an action may be selected and associated with the position.

Each action in the library is configured to physically transform a functional aspect of a device. As described in FIG. 4, each action may include a signal configured to convey the physical transformation. Following step (508), the remote device is calibrated with the selected action (510). More specifically, a functional aspect of the remote device is transformed or defined to transform based on the sensor configuration. After the device is calibrated with the selected action associated with the acquired sensor position, a signal is assigned to the action, e.g. sensor measurements for the set interval, (512). The measurements, rule, and associated signal are saved in the respective data structure (514) in a corpus. Accordingly, as shown, the write mode supports defining a new action to control the remote device, or in one embodiment to re-define an existing action associated with control of the remote device.

The process shown in FIG. 5 may also be described as calibrating the system to accommodate new actions, or re-defining existing actions. In one embodiment, the system is set to a write mode, which captures sensor position data, and in one embodiment assigns new rules based on the sensors being held in position for the required interval while in the write mode. The write mode enables new rules and associated actions to be configured and saved.

The process shown and described in FIG. 5 enables assignment of a new position set to an action. In one embodiment, the assignment may be adaptive based on a set of one or more actions that have been assigned for the sensor configured, and in one embodiment, the use of the sensor arrangement. For example, in one embodiment, the system may be set to an adaptive mode as a form of the write mode where actions are assigned to an acquired sensor position.

Figure 6:
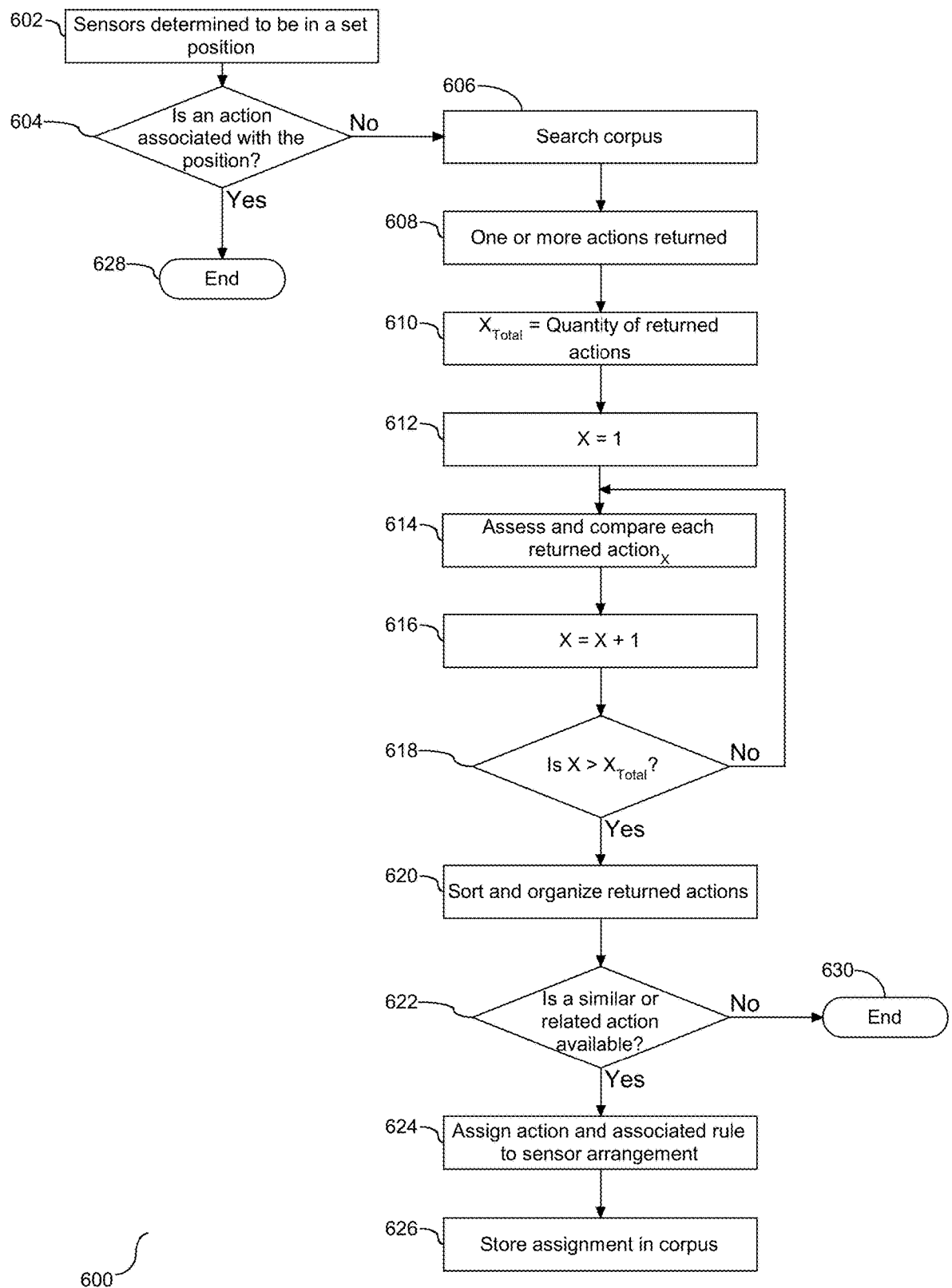
FIG. 6 depicts a flow chart illustrating a process for adaptively assigning an action and associated rule to an acquired sensor position.

Referring to FIG. 6, a flow chart (600) is provided illustrating a process for adaptively assigning an action and associated rule to an acquired sensor position, also referred to herein as a training mode. In this mode, e.g. the training mode, a set of actions and associated rules for a set of sensor are pre-defined or previously written, so that a set of sensor positions have a corresponding action. As the sensors are determined to be in a set position for at least the defined time interval to associate the position with an action (602), it is determined if there is an action associated with the position(s) (604). Since the training mode assigns new actions and rules to new sensor position, a positive response to the determination at step (604) concludes the adaptive learning process (628). A negative response to the determination at step (604) is followed by searching the library or corpus for defined actions that have similar sensor positioning (606). More specifically, at step (606), the corpus is searched to find actions that are already defined and have sensor proximity data similar to that in the acquired position. It is understood that related device actions may be associated with related sensor proximity data and associated measurements. Accordingly, a set of defined actions are returned so that the proximity of the defined actions to the sensor proximity data may be assessed.

One or more actions may be returned from the corpus (608). The variable $X_{Total}$ is assigned to the quantity of returned actions (610), and an associated action counting variable, X, is initialized (612). For each returned action$_x$, the sensor position data is assessed and compared to the previously acquired sensor position data, with the difference being associated with the current position data (614). The evaluation at step (614) takes places for each returned action. Following step (614), the action counting variable is incremented (616), and it is determined if all of the actions have been evaluated (618). A negative response to the determination at step (618) is followed by a return to step (614), and a positive response to the determination at step (618) concludes the sensor position comparison and assessment. For each action returned from the corpus, and the assessment associated with each action, a sorting is conducted (620) to organize the returned action. In one embodiment, the sorting includes a hierarchical organization. Similarly, in one embodiment, similarity between sensor measurements may be assigned to a related action. Based on the sorting of assigned actions and proximity of sensor measurements, it is determined if a similar or related action is available for assignment (622). A positive response to the determination at step (622) is followed by assignment of the related and available action and associated rule to the current sensor proximity measurements (624), and storing the assignment in the corpus (626). Similarly, a negative response to the determination at step (622) concludes the adaptive assignment for the current sensor position (630). Accordingly, and as shown, the training mode enables an action and associated rule to be applied to the sensor position based on proximity to one or more related actions in the corpus, and in one embodiment, allows existing rules to automatically be redefined in the corpus.

As shown in FIG. 2, there may be a plurality of users with each user having an associated data structure to organize sensor position data, action, and rule assignment. For example, the data structure may be stored in a shared resource accessible through a network connection, with multiple entities storing their specific sensor and associated action data. In the adaptive process shown and described in FIG. 6, the similarity assessment at step (622) may be expanded beyond the corpus of the current user and may include the corpus of other users to determine how and if the current proximity position data has been assigned. Accordingly, the adaptive assignment process may be expanded to consider action assignments of other users.

The process shown in FIG. 6 may also be described as training the system to accommodate an appropriate action based on non-exact matches, and in one embodiment, automatically re-defining existing actions in the corpus if needed. For example, in one embodiment, the system may be set to a training mode, which captures sensor position data, and determines the appropriate action from the corpus in the case of a non-exact match. In another embodiment, the training mode allows or otherwise accommodates an automatic update to one or more existing entries in the corpus.

Figure 7:
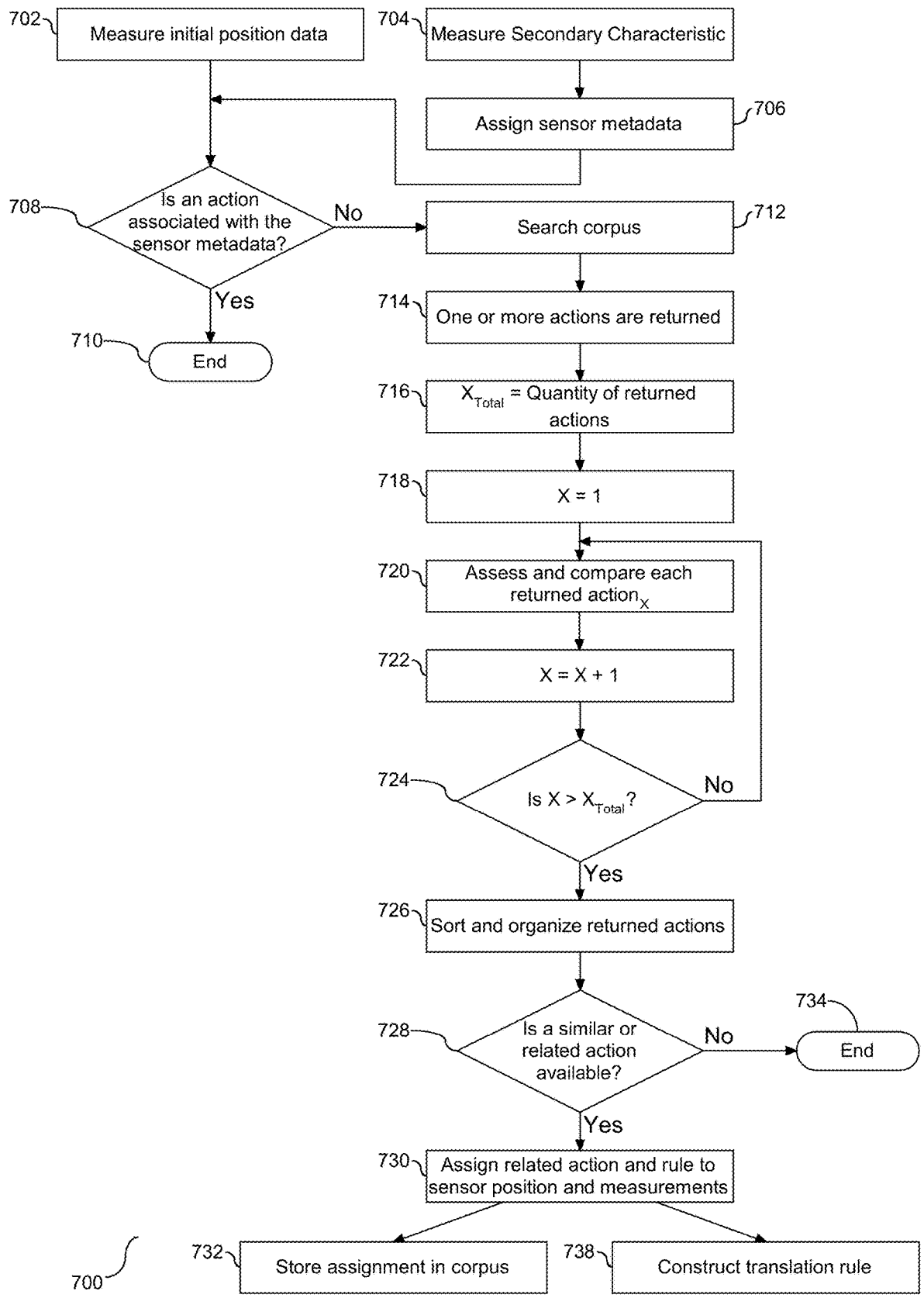
FIG. 7 depicts a flow chart illustrating a process for a learning mode.

Referring to FIG. 7, a flow chart (700) is provided illustrating a process for acquiring sensor metadata. The process shown herein is also referred to herein as a learning mode. An initial position of both the sensors and hub is measured (702). More specifically, the initial distance between each sensor and the hub is measured at step (702).

In addition, one or more secondary characteristics associated with the sensor positioning is measured, acquired or input (704). The secondary characteristic(s) is assigned to the associated sensor as sensor metadata (706). The secondary characteristic could be measured prior, simultaneously or after the sensor position and associated distance are measured. The secondary characteristic may take on different forms, with each form directly or indirectly related to the ability to replicate a set of sensor positions. For example, the secondary characteristic may include, but is not limited to, secondary surface size, secondary surface flexibility, secondary surface length, temperature, humidity, acceleration, pressure, orientation, conductivity, voltage, amperage or other similar characteristic. It is then determined if there is an action associated with the position(s) and sensor metadata (708). Since the adaptive learning mode assigns new actions and rules to new sensor position(s), a positive response to the determination at step (708) concludes the adaptive learning process (710). A negative response to the determination at step (708) is followed by searching the library or corpus for defined actions that have similar sensor positioning, evidence of a sensor metadata or a rule to translate the sensor positioning data (712). More specifically, at step (712), the corpus is searched to find actions that are already defined and have sensor proximity data and sensor metadata similar to that in the acquired position. It is understood that related device actions may be associated with related sensor proximity data, sensor metadata and associated measurements. Accordingly, a set of defined actions are returned so that the proximity of the defined actions to the sensor proximity data may be assessed.

One or more actions may be returned from the corpus (714). The variable $X_{Total}$ is assigned to the quantity of returned actions (716), and an associated action counting variable, X, is initialized (718). For each returned action$_x$, the sensor position data and sensor metadata is evaluated, and more specifically, each action is assessed and compared to the previously acquired sensor position data, with the difference being associated with the current position data (720). Following the action evaluation at step (720), the action counting variable is incremented (722), and it is determined if all of the actions have been evaluated (724). A negative response to the determination at step (724) is followed by a return to step (720), and a positive response to the determination at step (724) concludes the position comparison assessment. For each action returned from the corpus, and the assessment associated with each action, a sorting is conducted (726) to organize the returned actions, which in one embodiment may be a hierarchical sort. Based on the sorting of assigned actions and proximity of sensor measurements, it is determined if a similar or related action is available for assignment (728). A positive response to the determination at step (728) is followed by assignment of the related and available action and associated rule to the current sensor proximity measurements (730), and storing the assignment in the corpus (732). However, a negative response to the determination at step (728) concludes the adaptive assignment for the current sensor position (734). Optionally, in the learning mode sensor metadata may be used to construct a rule (738) to translate the sensor position data prior to comparing it to the corpus (or translate the corpus prior to comparing to the sensor position data) in order to create a higher probability of exact matches or more precise matches for comparison in step 712. Optionally, the rule may be stored in the corpus. Accordingly, and as shown, the learning mode enables an action and associated rule to be applied to the sensor position based on a secondary characteristic to one or more related actions in the corpus, and in one embodiment, allows existing rules to automatically be redefined in the corpus. In another embodiment, learning mode provides a translation rule for translating the sensor position data and sensor metadata prior to searching the corpus.

The process shown in FIG. 7 may also be described as the system learning to accommodate the environment. It allows the system to adapt to the environment it is used in and automatically re-define existing actions in the corpus, if needed. In one embodiment, the system is set to a learning mode, which captures sensor position data and at least one secondary characteristic, and determines the appropriate action from the corpus in the case of a non-exact match. In one embodiment, the learning mode allows the system to create rules to translate the sensor position data in order to create more exact matches and at least more accurate matches in the corpus. In another embodiment, the rule can be saved in the corpus for other users to access. In another embodiment, the system can update at least one rule already contained in the corpus.

It is understood that different entities within the system may have different characteristics inherent to their respective environments. For example, each user employing the sensors may have associated characteristics that are inherent to that specific user. An example of the associated characteristics may be directed to the user's dexterity, the length of their fingers, size of their hand, tremors, etc. As such, even with a set of actions and associated sensor position rules, each set of sensors should be trained to understand their environment so that measurements may incorporate such environmental characteristics.

In one embodiment, a set of three sensors are positioned on a secondary surface. The secondary surface being a hand, the first sensor attached to the second finger, the second sensor attached to the third finger, and the hub attached to an associated palm. The hub is in communication with a remote interface device. The remote interface device is in communication with a television which is powered on. An initial position of the sensors and hub are measured while both fingers are fully extended and in the same plane as the palm. Then, a second position is measured with the position of the palm and third finger unchanged but, the second finger is now perpendicular to the third finger. The hub communicates the measurements to the remote interface. The remote interface searches for the changed position in a library and determines the associated action to the changed position is for the television to power off. The remote interface device communicates with the television and the television powers off.

The system and operating modes of the system, shown and described in FIGS. 1-7, may operate through shared resources, e.g. cloud based resources, accessible through one or more network connections. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 8:
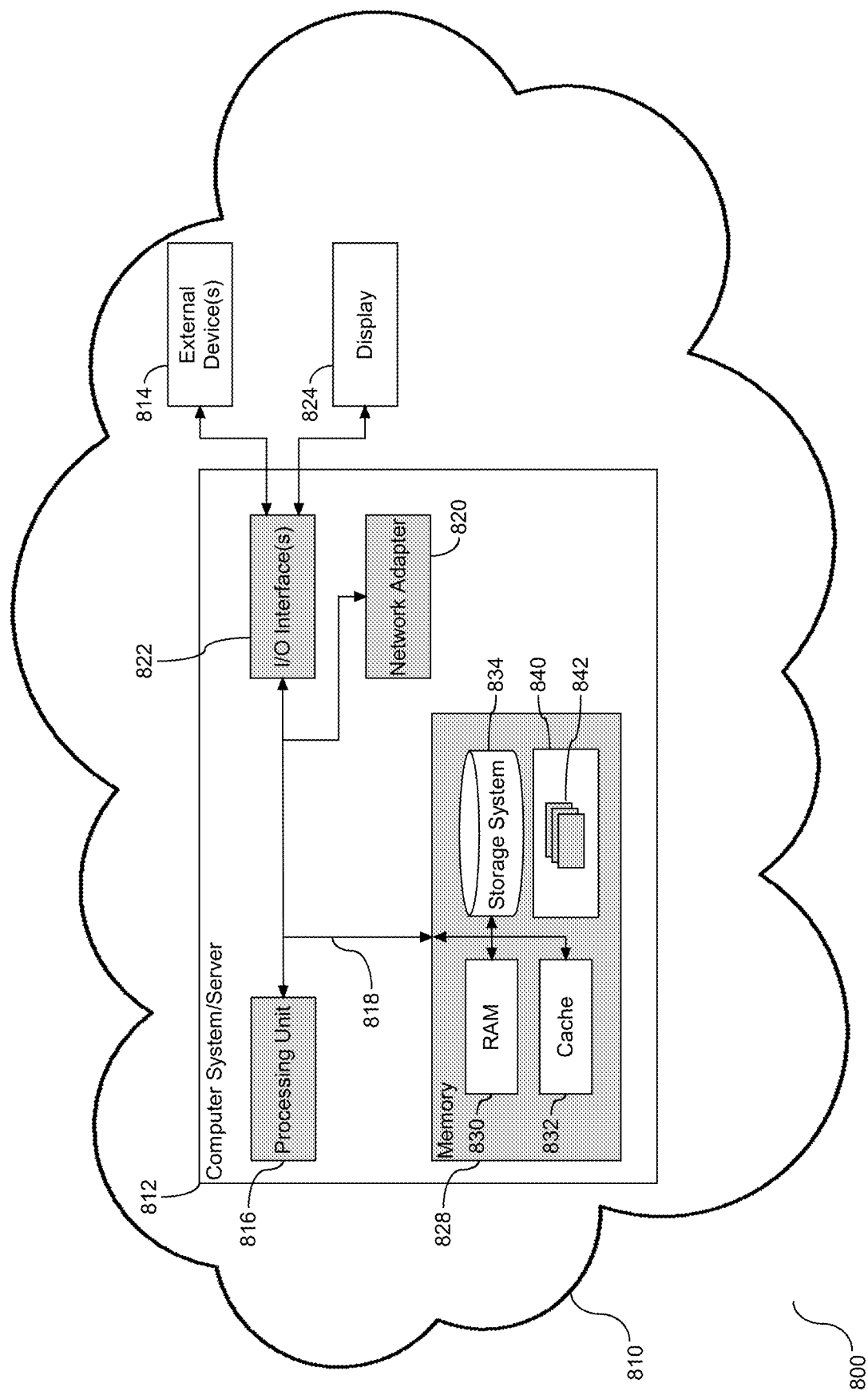
FIG. 8 depicts a schematic example of a cloud computing node.

Referring now to FIG. 8, a block diagram (800) of an example of a server/host (812) in a cloud computing environment (810). Cloud computing server (812) is only one example of a suitable cloud computing node and is not intended to suggest any limitation as to the scope of use or functionality of the embodiments described herein. Regardless, the cloud computing node is capable of being implemented and/or performing any of the functionality set forth hereinabove.

In the cloud computing environment (810), server (812) may operate with numerous other general purpose or special purpose computing system environments or configurations. Examples of well-known computing systems, environments, and/or configurations that may be suitable for use with computer system/server (812) include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server (812) may be described in the general context of computer system executable instructions, such as program modules, being executed by a computer system. Generally, program modules may include routines, programs, objects, components, logic, data structures, and so on that perform particular tasks or implement particular abstract data types. Computer system/server (812) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server (812) in the cloud computing environment (810) is shown in the form of a general-purpose computing device. The components of computer system/server (812) may include, but are not limited to, one or more processors or processing units (816), a system memory (828), and a bus (818) that couples various system components, including system memory (828) to processor (816).

Bus (818) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server (812) typically includes a variety of computer system readable media. Such media may be any available media that is accessible by computer system/server (812), and it includes both volatile and non-volatile media, removable and non-removable media.

System memory (828) can include computer system readable media in the form of volatile memory, such as random access memory (RAM) (830) and/or cache memory (832). Computer system/server (812) may further include other removable/non-removable, volatile/non-volatile computer system storage media. By way of example only, storage system (834) can be provided for reading from and writing to a non-removable, non-volatile magnetic media (not shown and typically called a "hard drive"). Although not shown, a magnetic disk drive for reading from and writing to a removable, non-volatile magnetic disk (e.g. a "floppy disk"), and an optical disk drive for reading from or writing to a removable, non-volatile optical disk such as a CD-ROM, DVD-ROM or other optical media can be provided. In such instances, each can be connected to bus (818) by one or more data media interfaces. As will be further depicted and described below, memory (828) may include at least one program product having a set (e.g., at least one) of program modules that are configured to carry out the functions of embodiments.

Program/utility (840), having a set (at least one) of program modules (842), may be stored in memory (828) by way of example, and not limitation, as well as an operating system, one or more application programs, other program modules, and program data. Each of the operating system, one or more application programs, other program modules, and program data or some combination thereof, may include an implementation of a networking environment. Program modules (842) generally carry out the functions and/or methodologies of the embodiments as described herein.

Computer system/server (812) may also communicate with one or more external devices (814) such as a keyboard, a pointing device, a display (824), etc.; one or more devices that enable a user to interact with computer system/server (812); and/or any devices (e.g., network card, modem, etc.) that enable computer system/server (812) to communicate with one or more other computing devices. Such communication can occur via Input/Output (I/O) interfaces (822). Still yet, computer system/server (812) can communicate with one or more networks such as a local area network (LAN), a general wide area network (WAN), and/or a public network (e.g., the Internet) via network adapter (820). As depicted, network adapter (820) communicates with the other components of computer system/server (812) via bus (818). It should be understood that although not shown, other hardware and/or software components could be used in conjunction with computer system/server (812). Examples, include, but are not limited to: microcode, device drivers, redundant processing units, external disk drive arrays, RAID systems, tape drives, and data archival storage systems, etc.

Figure 9:
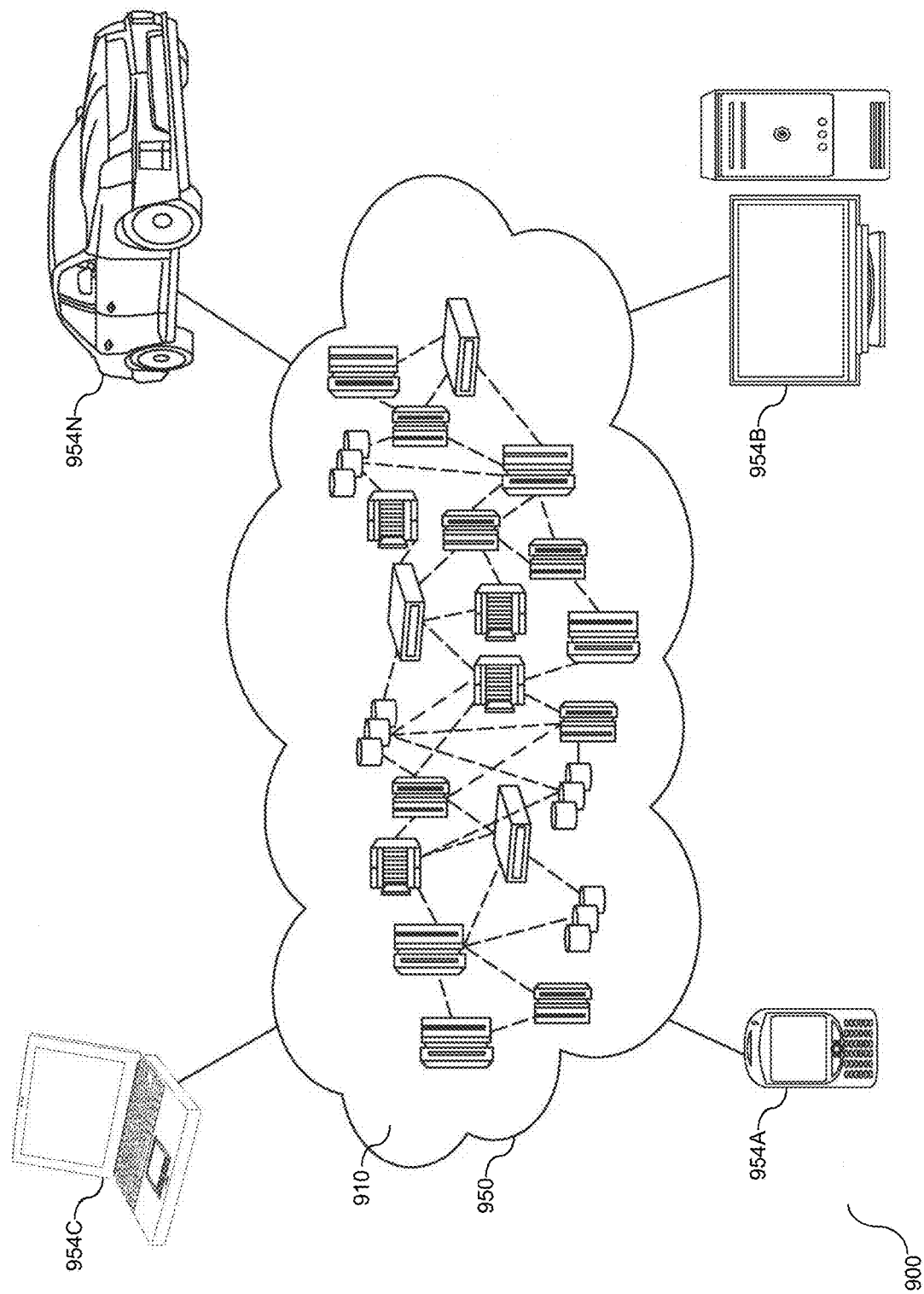
FIG. 9 depicts a block diagram illustrative of a cloud computing environment, according to an embodiment.

Referring now to FIG. 9, illustrative cloud computing environment (900) is depicted. As shown, cloud computing environment (900) includes one or more cloud computing nodes (910) with which local computing devices used by cloud consumers may communicate. Examples of these local computing devices include, but are not limited to, personal digital assistant (PDA) or cellular telephone (920), desktop computer (930), laptop computer (940), and/or automobile computer system (950). Individual nodes within nodes (910) may further communicate with one another. They may be grouped (not shown) physically or virtually, in one or more networks, such as Private, Community, Public, or Hybrid clouds as described hereinabove, or a combination thereof. This allows cloud computing environment (900) to offer infrastructure, platforms and/or software as services for which a cloud consumer does not need to maintain resources on a local computing device. It is understood that the types of computing devices (920)-(950) shown in FIG. 9 are intended to be illustrative only and that computing nodes (910) and cloud computing environment (900) can communicate with any type of computerized device over any type of network and/or network addressable connection (e.g., using a web browser).

Figure 10:
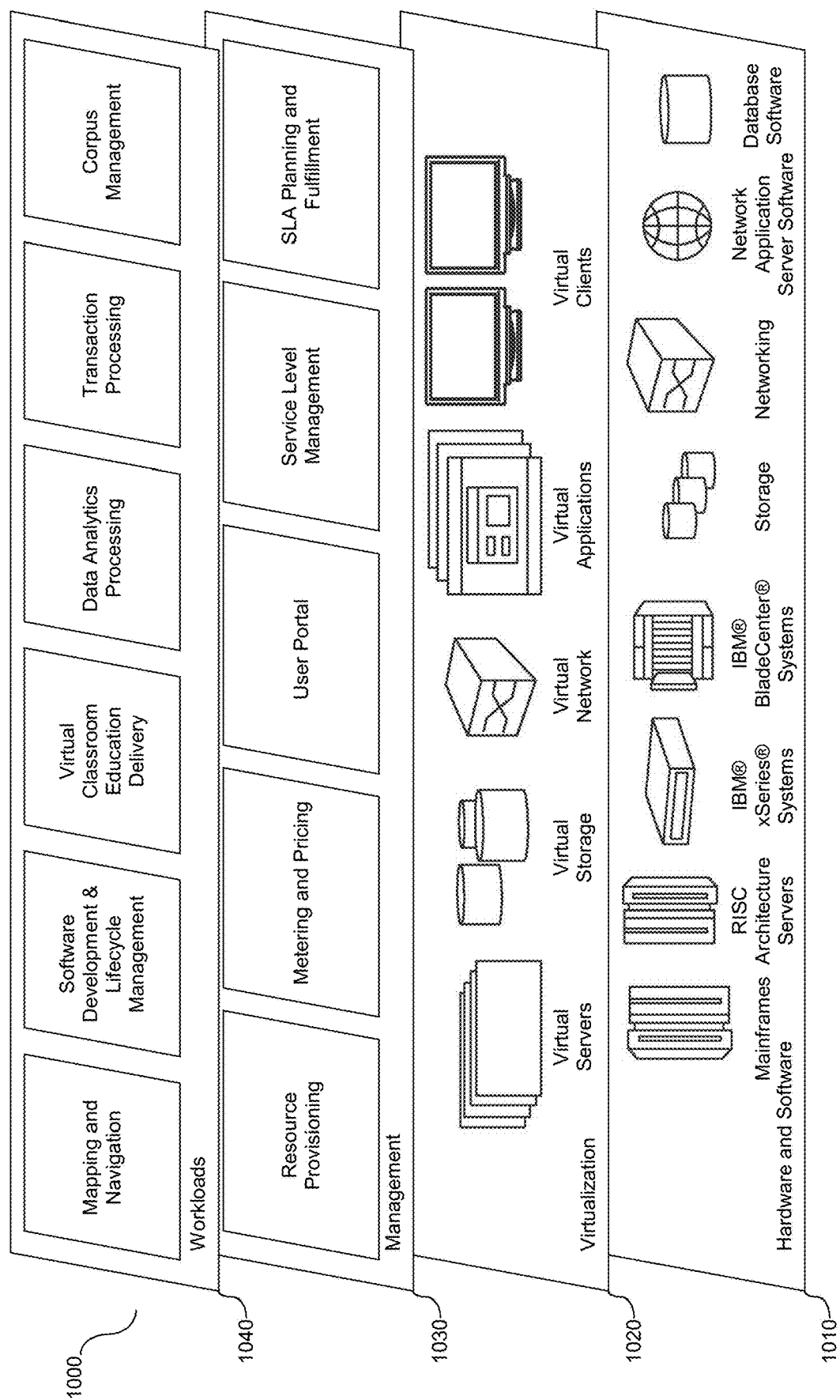
FIG. 10 depicts a block diagram illustrating a set of functional abstraction model layers provided by the cloud computing environment, according to an embodiment.

Referring now to FIG. 10, a set of functional abstraction layers provided by cloud computing environment (1000) is shown. It should be understood in advance that the components, layers, and functions shown in FIG. 10 are intended to be illustrative only, and the embodiments are not limited thereto. As depicted, the following layers and corresponding functions are provided: hardware and software layer (1010), virtualization layer (1020), management layer (1030), and workload layer (1040). The hardware and software layer (1010) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (1020) provides an abstraction layer from which the following examples of virtual entities may be provided: virtual servers; virtual storage; virtual networks, including virtual private networks; virtual applications and operating systems; and virtual clients.

In one example, management layer (1030) may provide the following functions: resource provisioning, metering and pricing, user portal, service level management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (1040) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and proximity sensor and device management and support within the cloud computing environment.

In the shared pool of configurable computer resources described herein, hereinafter referred to as a cloud computing environment, files may be shared among users within multiple data centers, also referred to herein as data sites. A series of mechanisms are provided within the shared pool to provide decision making controls for access to one or more records based upon associated record access and inherent characteristics of privacy. Different operating modes are employed with respect to configuration and use of proximity sensors, including listening, writing, training, and learning. Each mode uses or otherwise contributes to a knowledge bases, also referred to herein as a library and/or corpus. Analytical techniques employ the knowledge bases to assist with accessing, controlling functionality, and/or changing an operating state of a remote device.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may be utilized, and may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for the embodiments described herein may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments are described above with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow chart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flow chart and/or block diagram block or blocks.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The embodiments described herein may be implemented in a system, a method, and/or a computer program product. The computer program product may include a computer readable storage medium (or media) having computer readable program instructions thereon for causing a processor to carry out the embodiments described herein.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The embodiments are described herein with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The device described above in FIG. 1 has been labeled with tools in the form of a tool (148) and an evaluator (152). The tools may be implemented in programmable hardware devices such as field programmable gate arrays, programmable array logic, programmable logic devices, or the like. The tools may also be implemented in software for execution by various types of processors. An identified functional unit of executable code may, for instance, comprise one or more physical or logical blocks of computer instructions which may, for instance, be organized as an object, procedure, function, or other construct. Nevertheless, the executable of the tools need not be physically located together, but may comprise disparate instructions stored in different locations which, when joined logically together, comprise the tools and achieve the stated purpose of the tool.

The evaluator (152) may be implemented in programmable hardware devices such as field programmable gate arrays, programmable array logic, programmable logic devices, or the like. The evaluator (152) may also be implemented in software for execution by various types of processors. An identified functional unit of executable code may, for instance, comprise one or more physical or logical blocks of computer instructions which may, for instance, be organized as an object, procedure, function, or other construct. Nevertheless, the executable of the evaluator (152) need not be physically located together, but may comprise disparate instructions stored in different locations which, when joined logically together, comprise the evaluator and achieve the stated purpose of the evaluator.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single data set, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the embodiments.

In this document, the terms "computer program medium," "computer usable medium," and "computer readable medium" are used to generally refer to media such as system memory (828), volatile memory (830), cache memory (832), and persistent memory (834).

Computer programs (also called computer control logic) are stored in system memory (828). Computer programs may also be received via a communication interface (820). Such computer programs, when run, enable the computer system to perform the features of the present embodiments as discussed herein. In particular, the computer programs, when run, enable the processor (816) to perform the features of the computer system. Accordingly, such computer programs represent controllers of the computer system.

The present embodiments may be a system, a method, and/or a computer program product. The computer program product may include a computer readable storage medium (or media) having computer readable program instructions thereon for causing a processor to carry out aspects of the present embodiments.

The computer readable storage device can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles of the embodiments and the practical application, and to enable others of ordinary skill in the art to understand the embodiments for various embodiments with various modifications as are suited to the particular use contemplated. Accordingly, the implementation of proximity detection and analysis of proximity sensors and translating the proximity into one or more commands provides a communication interface with a remote device.

It will be appreciated that, although specific embodiments have been described herein for purposes of illustration, various modifications may be made without departing from the spirit and scope of the embodiments. In particular, placement and positioning of the proximity sensors should not be limited to the hand, or even to a single hand. For example, the proximity sensors and associated hub may employ both hands of an entity. Similarly, the sensors and hub can be applied to other parts of the body, including but not limited to, positioning the sensors on toes and the hub to middle of a foot or the proximity sensors could be placed on each hand and foot while the hub is placed on the chest. Further, there could be multiple proximity sensors applied to each finger, toe or palm. Additionally, the distance measured does not have to be between adjacent sensors, instead it could be measured between any of the sensors in the system. Accordingly, the scope of protection of the embodiments is limited only by the following claims and their equivalents.

What is claimed is:

1. A computer system comprising:
a first set of sensors including two or more sensors operatively coupled to a sensor hub, the first of the sensors, Si, fixed to a first location, a second of the sensors, Sj, fixed to a second location, and the hub fixed to a third location;
the sensor hub in communication with a remote interface;
the remote interface operatively coupled to a device;
a tool in communication with the sensor hub to utilize sensor position data to interface with the device, including:
measure an initial set of sensor positions, including a first distance between sensors, Si and Sj;
measure, through sensors Si and Sj, a secondary characteristic associated with at least one of the sensors and assign the secondary characteristic to a secondary measurement and saving it as sensor metadata;
associate a secondary rule with the metadata, wherein the secondary rule defines a translation between the secondary characteristic and the sensor position data;
read a changed position of the sensors from the initial set of sensor positions, including a second distance between sensors Si and Sj;
search a corpus with the secondary rule and the changed position data for evidence of at least one action matching the changed position; and
select the at least one action, and communicate the at least one action, Aij, to a remote physical device, the at least one action to physically transform a functional aspect of the device.

2. The system of claim 1, wherein the sensor metadata includes the measured initial set of sensor positions and the measured first distances.

3. The system of claim 1, further comprising the tool to search the corpus for evidence of the sensor metadata, and generate a first outcome set of actions wherein the at least one action is selected from the first outcome set.

4. The system of claim 1, wherein the secondary characteristic is selected from the group consisting of: secondary surface size, secondary surface flexibility, and secondary surface length.

5. The system of claim 1, further comprising the tool to amend the corpus, including assign the secondary measurement and sensor position data to a rule, generate an amended rule, and save the amended rule in the corpus.

6. The system of claim 1, wherein the secondary rule is associated to the metadata by searching the corpus for evidence of the sensor metadata, and generating a new secondary rule.

7. A computer program product for utilizing proximity sensor positioning for interfacing with a device, the computer program product comprising a computer readable storage device having program code embodied therewith, the program code executable by a processing unit to:
measure an initial set of sensor positions, including a first distance between wearable sensors, Si and Sj;
measure, through wearable sensors Si and Sj, a secondary characteristic associated with at least one of the sensors, and assign the measured secondary characteristic to a secondary measurement and saving it as sensor metadata;
associate a secondary rule with the sensor metadata, wherein the secondary rule defines a translation between the secondary characteristic and the sensor position data;
read a changed position of the sensors from the initial set of sensor positions, including measure a second distances between wearable sensors, Si and Sj for the changed position;
search the corpus with the secondary rule and the changed position data for evidence of at least one action matching the changed position; and
select the at least one action, and communicate the at least one action, Aij, to a remote physical device, the at least one action to physically transform a function aspect of the device.

8. The computer program product of claim 7, wherein the sensor metadata includes the measured initial set of sensor positions and the measured first distances.

9. The computer program product of claim 7, further comprising program code to search the corpus for evidence of the sensor metadata, and generate a first outcome set of actions wherein the at least one action, Aij, is selected from the first outcome set.

10. The computer program product of claim 7, wherein the secondary characteristic is selected from the group consisting of: secondary surface size, secondary surface flexibility, and secondary surface length.

11. The computer program product of claim 7, further comprising program code to amend the corpus, including assigning the secondary measurement and sensor position data to a rule, generating an amended rule, and saving the amended rule in the corpus.

12. The computer program product of claim 7, wherein the secondary rule is associated to the sensor metadata by searching the corpus for evidence of the sensor metadata, and generating a new secondary rule.

13. A method for utilizing proximity sensor positioning for interfacing with a device, comprising:
positioning wearable sensors, Si and Sj;
measuring an initial set of sensor positions, including a first distance between wearable sensors, Si and Sj;
measuring a secondary characteristic associated with at least one of the sensors, and assigning the measured secondary characteristic to a secondary measurement and saving it as sensor metadata;
associating a secondary rule with the sensor metadata, wherein the secondary rule defines a translation between the secondary characteristic and the sensor position data;

reading a changed position of the sensors from the initial set of sensor positions, including measure a second distance between wearable sensors Si and Sj for the changed position;

searching the corpus with the secondary rule and the changed position data for evidence of at least one action matching the changed position; and selecting the at least one action, and communicating the at least one action, Aij, to a remote physical device, the action to physically transform a functional aspect of the device.

14. The method of claim 13, wherein the sensor metadata includes the measured initial set of sensor positions and the measured first distances.

15. The method of claim 13, further comprising searching the corpus for evidence of the sensor metadata, and generating a first outcome set of actions wherein the at least one action, Aij, is selected from the first outcome set.

16. The method of claim 13, wherein, the secondary characteristic is selected from the group consisting of: secondary surface size, secondary surface flexibility, and secondary surface length.

17. The method of claim 13, further comprising amending the corpus, including assigning the secondary measurement and sensor position data to a rule, generating an amended rule, and saving the amended rule in the corpus.

18. The method of claim 13, wherein the secondary rule is associated to the metadata by searching a corpus for evidence of the sensor metadata, and generating a new secondary rule.

* * * * *